(12) United States Patent  
Meter

(10) Patent No.: US 8,800,497 B2
(45) Date of Patent: Aug. 12, 2014

(54) USE OF A CYCLONE SEPARATOR AND CLIMATE CHAMBER FOR HATCHING EGGS AND/OR KEEPING POULTRY

(75) Inventor: Tjitze Meter, Veenendaal (NL)

(73) Assignee: HatchTech Group B.V., Veenendaal (NL)

(*) Notice: Subject to any disclaimer, the term of this patent is extended or adjusted under 35 U.S.C. 154(b) by 86 days.

(21) Appl. No.: 12/919,464

(22) PCT Filed: Feb. 25, 2008

(86) PCT No.: PCT/NL2008/050111
§ 371 (c)(1),
(2), (4) Date: Aug. 25, 2010

(87) PCT Pub. No.: WO2009/116851
PCT Pub. Date: Sep. 24, 2009

(65) Prior Publication Data
US 2011/0000437 A1   Jan. 6, 2011

(51) Int. Cl.
*A01K 41/00* (2006.01)
(52) U.S. Cl.
USPC .......................... 119/311; 119/419
(58) Field of Classification Search
USPC ........................... 119/311, 418, 419
See application file for complete search history.

(56) References Cited

U.S. PATENT DOCUMENTS

| 2,630,098 | A |   | 3/1953 | Waniewski, et al. |
| 2,791,199 | A | * | 5/1957 | Hamnett ............. 119/311 |
| 2,997,021 | A | * | 8/1961 | Bailey ............... 119/311 |
| 3,035,920 | A |   | 5/1962 | Knodt |
| 3,240,000 | A | * | 3/1966 | Hayes et al. ........... 55/337 |
| 3,396,702 | A |   | 8/1968 | Trussell |
| 3,396,703 | A | * | 8/1968 | Trussell ............. 119/301 |
| 3,820,507 | A | * | 6/1974 | Dugan et al. ......... 119/311 |

(Continued)

FOREIGN PATENT DOCUMENTS

EP   1 104 987 B1   3/2004
FR   1468142 A      2/1967

(Continued)

OTHER PUBLICATIONS

NCEA, "Recommended methods for the preconditioning of Odorous air prior to treatment in organic biofilters" 2004.*

(Continued)

*Primary Examiner* — David Parsley
*Assistant Examiner* — Thien Thanh Pham
(74) *Attorney, Agent, or Firm* — Gilberto M. Villacorta; Sunit Talapatra; Foley & Lardner LLP

(57) ABSTRACT

The invention relates to the use of a cyclone separator for separating keratin particles originating from poultry out of a gas, in particular air. The separated particles comprise down particles. The invention furthermore relates to a climate chamber for hatching eggs and/or keeping poultry. Said climate chamber comprises a substantially closed compartment having two opposite side walls provided with one or more passages; as well as a substantially closed duct which extends outside the compartment and connects one of said side walls to the other of said side walls so as to form a substantially closed circuit together with the compartment. Said climate chamber furthermore comprises a cyclone separator, the inlet of which ends in the substantially closed duct and the outlet of which ends outside the closed duct for discharging into the environment.

12 Claims, 7 Drawing Sheets

(56) References Cited

U.S. PATENT DOCUMENTS

| | | | |
|---|---|---|---|
| 4,378,758 A | | 4/1983 | Coleman |
| 4,606,299 A | * | 8/1986 | Grumbach .................... 119/311 |
| 4,862,831 A | * | 9/1989 | Graham ........................ 119/419 |
| 2004/0028115 A1 | * | 2/2004 | Meter ........................... 374/109 |

FOREIGN PATENT DOCUMENTS

| WO | WO-99/11145 A1 | 3/1999 |
|---|---|---|
| WO | WO 00/08922 A1 | 2/2000 |
| WO | WO-02/39812 A1 | 5/2002 |
| WO | WO-2004/047527 A1 | 6/2004 |
| WO | WO-2005/070198 A1 | 8/2005 |
| WO | WO-2007/142511 A1 | 12/2007 |
| WO | WO 2009/014422 A1 | 1/2009 |

OTHER PUBLICATIONS

International search Report for International Application No. PCT/NL2008/050111, published as International Publication No. WO 2009/116851 on Sep. 24, 2009.

International Search Report mailed Dec. 27, 2010 in International Application No. PCT/NL2010/050208.

International Search Report mailed Dec. 29, 2010 in International Application No. PCT/NL2010/050210.

International Search Report mailed Feb. 16, 2011 in International Application No. PCT/NL2010/050203.

* cited by examiner

USE OF A CYCLONE SEPARATOR AND CLIMATE CHAMBER FOR HATCHING EGGS AND/OR KEEPING POULTRY

The present invention relates to the field of young birds, in particular to the field of bird chicks.

Poultry, such as chickens, but also turkeys and other birds, are nowadays hatched and treated in hatcheries. This process starts with the eggs being hatched in a climate chamber. After the eggs have hatched, the young chicks may be reared in the climate chamber for some time, which may also be a different climate chamber than the one in which the eggs were hatched. Raising the chicks also takes place in other chambers. Furthermore, the chicks are being subjected to operations, both manual operations in which individuals handle the chicks or crates with chicks, and automated operations, such as the emptying of a crate containing chicks onto a conveyor belt, during which a large amount of dust/down particles originating from the chicks is released in practice.

Hatching eggs and rearing the chicks is often carried out in a large hatchery or chick-rearing facility, that is to say a large building having several treatment chambers. A major problem which occurs in this connection is the transmission of microorganisms, such as bacteria, viruses and yeasts. Young chicks are carriers of microorganisms which easily spread amongst the animals and thus also to people working in the hatchery. Such microorganisms can be harmful to the (young) animals and humans. For that reason, people working in a hatchery wear breathing masks in order to prevent being infected by microorganisms. It is an object of the present invention to combat the spread of microorganisms, such as bacteria, viruses and yeasts, in a poultry environment containing young birds. The Applicant has found that a cyclone separator can be used for this purpose.

This object is achieved according to the invention by using a cyclone separator for separating microorganisms out of a gas, in particular air.

The Applicant has found that the microorganisms, such as bacteria, viruses and yeasts, are spread by keratin particles which float in the air, or another gas, in the vicinity of the poultry. The keratin particles act as carriers for the germs. By now removing these particles from the gas, in particular air, the spread of microorganisms, such as bacteria, viruses and yeasts, can substantially be prevented.

The object according to the invention is thus achieved by using a cyclone separator for separating keratin-comprising particles originating from young birds out of a gas, in particular air.

A cyclone separator is generally known from the state of the art. Cyclone separators are used for separating particles out of a gas stream which have a relatively large density. The air is introduced into the cyclone chamber and made to rotate. Relatively heavy particles present in the air are thus hurled outwards and come down the wall of the cyclone chamber to be collected in a reservoir. Gas from which the particles have been removed is discharged from the center of the cyclone chamber, at the top of the cyclone.

The invention relates in particular to live poultry.

According to a further aspect, the invention relates to the use of a cyclone separator in a hatchery for separating keratin-containing particles originating from poultry out of a gas, in particular air.

When used according to the invention, the poultry comprises chicks, in particular chicks younger than seven days. More particularly, the chicks are often younger than three days, such as one day or younger.

The keratin particles given off by young birds comprise in particular down particles. Down particles are very light and therefore readily float in a gas or air. Surprisingly, these very light down particles can be separated from a gas stream in a very effective manner by means of a cyclone separator. In practice, it has been found that the down particles in question are those of a size <0.1 mm and even ≤0.05 mm. Even down particles having a size of ≤0.01 mm can readily be separated out by means of such a cyclone separator, so that the spread of microorganisms is substantially prevented.

Tests have shown that when a cyclone separator is used in a poultry environment, down particles having a size in the range of 0.01 mm to 0.10 mm can be separated out very efficiently. However, smaller and larger particles have also been found in the reservoir of the cyclone separator during tests.

According to the invention, it is furthermore advantageous if, on the one hand, the poultry and any person treating the poultry who may be present and, on the other hand, the inlet and outlet of the cyclone separator are in the same, substantially closed, chamber. Thus, air is passed through the cyclone separator from said chamber and immediately circulated back into the chamber. The air quality in said chamber was found to have improved significantly without having to take many other measures, except arranging a cyclone separator in said chamber. This is beneficial for the person/persons working with the chicks. In addition, this is also beneficial for the chicks since the spread of microorganisms amongst chicks is thus prevented.

According to a further embodiment, the air to be discharged from a climate chamber, such as a hatching machine, is passed through the cyclone separator. Particularly with such climate chambers, in particular hatching machines, there are many bacteria in the air which are being carried by down particles or other keratin particles. It is therefore highly effective to pass the air to be discharged from a climate chamber through the cyclone separator.

According to a further use of the invention with a climate chamber, the climate chamber is of the type which comprises:
a substantially closed compartment having two opposite side walls provided with one or more passages;
a substantially closed duct which extends outside the compartment and connects one of said side walls to the other of said side walls so as to form a substantially closed circuit together with the compartment;
in which the gas stream is circulated through the circuit;
in which a supply ends in the substantially closed duct so as to supply air from the environment;
in which the inlet of the cyclone separator ends in the substantially closed duct; and
in which the outlet of the cyclone separator ends outside the closed duct for discharging into the environment.

Such a climate chamber is known from EP 1,104,987 and from application PCT/NL2007/050370 (application number) by the Applicant which was filed on Jul. 13, 2007.

In such a climate chamber, according to the invention, in particular at least one of the opposite side walls is designed as a perforated plate provided with a fluid line, through which said fluid is passed, in such a manner that a side wall forms a heat exchanger by means of which the temperature of the gas stream passing through said side wall can be influenced. Furthermore, according to the invention, in a climate chamber of this type, the compartment is advantageously subdivided into two or more subcompartments by at least one partition, with the partition running parallel to the two opposite side walls, and the partition being designed as a perforated plate provided with a fluid line, through which a fluid is passed, in such a manner that said side wall forms a heat exchanger by means of which the temperature of the gas stream passing through said side wall can be influenced.

According to a further aspect, the invention relates to a climate chamber for hatching eggs and/or keeping poultry, comprising:
a substantially closed compartment having two opposite side walls provided with one or more passages;
a substantially closed duct which extends outside the compartment and connects one of said side walls to the other of said side walls so as to form a substantially closed circuit together with the compartment;
a gas displacement device incorporated in the substantially closed duct for circulating a gas stream through the circuit;
a cyclone separator;
in which a supply ends in the substantially closed duct for supplying air from the environment;
in which the inlet of the cyclone separator ends in the substantially closed duct; and
in which the outlet of the cyclone separator ends outside the closed duct for discharging into the environment.

In particular with such climate chambers, the air which is to be discharged from such climate chambers contains many bacteria and germs carried on keratin particles, such as down particles. By passing the air to be discharged from the substantially closed duct through the cyclone separator, these bacteria and germs are separated out of the air together with the keratin particles on which they are carried.

With the climate chamber according to the invention, it is particularly advantageous if one of the side walls, at least part thereof, is designed to be pivotable about a pivot axis in such a manner that said part can be pivoted open from the boundary surface of said compartment defined by the side wall into an open position in order to give access to the duct; and if the cyclone separator is arranged in the duct, near said pivotable side wall, that the cyclone separator is accessible from the compartment for cleaning purposes when said side wall is in an open position. The cyclone separator is thus arranged in the climate chamber, namely in the duct, which connects one side of the compartment to the other side of the compartment for recirculating a gas stream, so that the cyclone separator does not take up any space outside the climate chamber. By providing the cyclone separator near a pivotable side wall, it becomes possible to approach the cyclone separator from the compartment. Thus, every time the compartment is empty, the collecting reservoir of the cyclone separator can be emptied and the inside of the cyclone separator can be cleaned, if necessary. As such, it is sufficient, in this case, if only a part of said side wall is pivotable. As the side wall is preferably designed as a perforated plate provided with a fluid line, it is preferable if the entire side wall can be pivoted as one single part. Preferably, the pivot axis runs vertically along one side of the pivotable side wall.

According to a further embodiment, it is advantageous if the pivotable side wall is entirely inside the compartment in the open position and if the compartment, on the side of the side wall turned away from the pivot axis, comprises a door for access to the compartment. Thus, the side wall can be pivoted open in an inward direction of the compartment, as it were, towards the rear wall, so that it is possible to access the cyclone separator from the door side of the compartment in the duct.

According to a further embodiment of the climate chamber according to the invention, the cyclone separator comprises:
a vertically arranged outer pipe having an inflow passage for allowing gas into said outer pipe;
a vertical inner pipe inserted from above into the outer pipe for allowing gas to stream from the inner pipe outward.

In this embodiment, it is furthermore advantageous if the bottom end of the inner pipe is lower than the inflow passage. With this embodiment, it is particularly advantageous if the internal diameter of the outer pipe, at the location of the inner pipe, is at most 35 cm, preferably at most 30 cm, such as approximately 26 cm.

According to a further embodiment, the external diameter of the inner pipe is at most 17.5 cm, preferably at most 15 cm, such as approximately 13 cm. The wall thickness of the inner pipe will usually be relatively small, such as smaller than 3 to 4 mm, so that the internal diameter of the inner pipe and the outer diameter of the inner pipe are approximately equal.

According to yet a further aspect, the invention relates to an assembly of two climate chambers according to the invention, in which each climate chamber comprises a rear wall which connects the side walls of the compartment to one another, and in which the rear walls of said two climate chambers are placed against one another back-to-back. In this manner, a space-saving arrangement of several climate chambers is made possible. This arrangement is possible according to the invention by the fact that a prior-art corridor between the rear walls of two climate chambers is now redundant. It is customary in the prior art to pass the air discharged from the climate chamber into this corridor, which results in down particles collecting on the floor in this corridor. In order to be able to remove these down particles, a person has to be able to pass through said corridor, which means that this corridor has to be at least approximately 75 cm wide. Furthermore, cleaning the down particles off the floor of the corridor is an unhealthy task for the staff. This unhealthy task is now completely obsolete.

The present invention will be described in more detail below with reference to an example illustrated in the drawing, in which.

Figure 1:
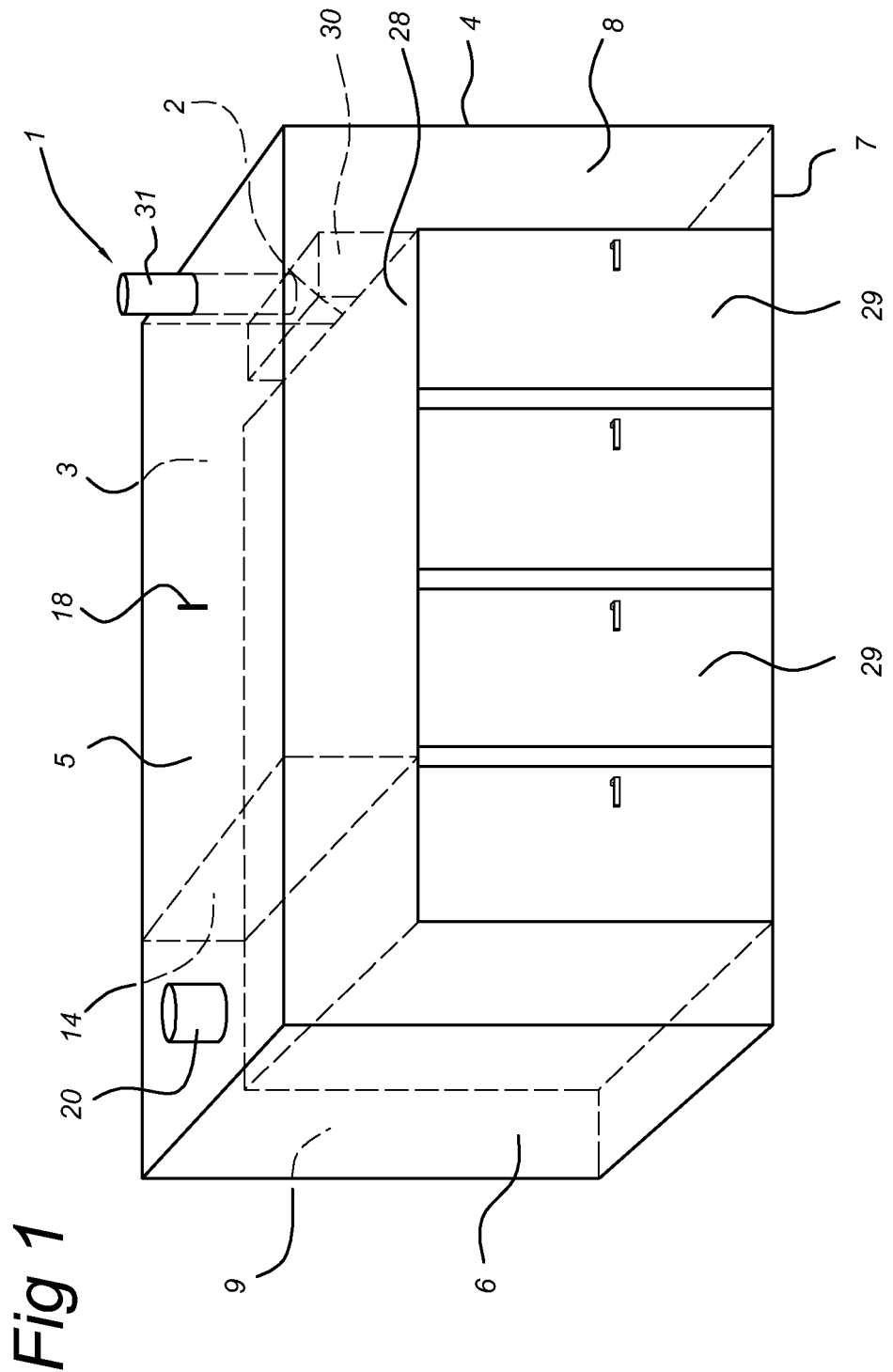
FIG. 1 shows a diagrammatic perspective view of a climate chamber according to the invention.
Figure 2:
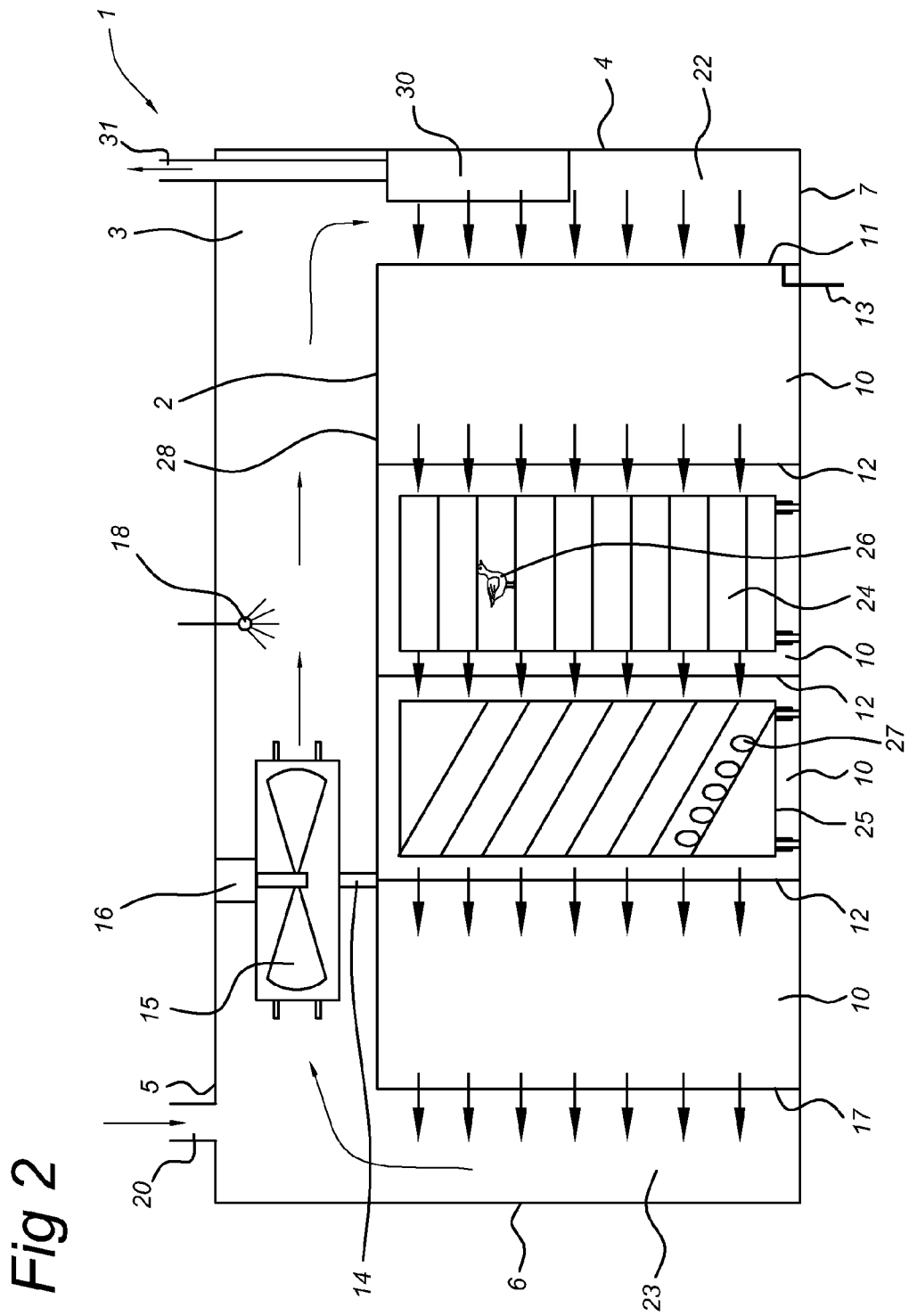
FIG. 2 shows a diagrammatic longitudinal section of the climate chamber from FIG. 1.

FIGS. 1 and 2 show a climate chamber 1 according to the invention. Said climate chamber 1 is delimited externally by two opposite side walls 4, 6, a rear wall 3, an opposite front wall 8, a ceiling 5 and a floor 7. In order to be able to control the temperature inside the climate chamber as well as possible, said walls, floor and the ceiling will preferably have been insulated.

The climate chamber comprises a compartment 2 through which climatized air is passed, in order to be able to control the climatological conditions, such as temperature, atmospheric humidity and composition of the air, etc., in the compartment 2. The compartment 2 is delimited by two opposite side walls 11, 17, by a rear wall which is the same as the rear wall 3 of the climate chamber, by a ceiling 28 and by a floor which may be the same as the floor 7 of the climate chamber. In this example, the compartment 2 is subdivided into four subcompartments 10, although fewer or more subcompartments 10 are also readily possible. The subcompartments 10 are in each case separated from one another by a heat exchanger 12. In addition, the side wall 11 is designed as a heat exchanger and, if desired, the side wall 17 may also be designed as a heat exchanger. The heat exchangers 11, 12 and possibly 17 may be designed in accordance with the description given in EP 1,104,987, in accordance with the description given in application PCT/NL2007/050370 (application number) filed by the Applicant on Jul. 13, 2007 or otherwise. The heat exchanger disclosed in EP 1,104,987 and PCT/NL2007/050370 essentially consists of a metal plate with a large number of perforations and fluid lines. In order to be able to influence the temperature of said plate, a fluid, in particular water, at a specific desired temperature is passed through the fluid lines, so that the plate is kept at or brought to a specific temperature.

The perforated plate is usually arranged vertically and a gas stream is passed through the perforated plate which, if the plate is arranged vertically, hits the plane of the plate at right angles, passes through the perforations and then flows out on the other side of the plate. While the gas stream is passing through the plate, the temperature of the gas stream can be influenced. If the temperature of the gas stream is to be raised, the plate will have a higher temperature than the gas stream or be brought to a higher temperature and if the temperature of the gas stream is to be lowered, the plate will have a lower temperature than the gas stream or be brought to a lower temperature. For a detailed description of an example of such a heat exchanger, reference is made to the aforementioned publication EP 1,104,987 and PCT/NL2007/050370 (application number) filed by the Applicant on Jul. 13, 2007.

As can be seen in FIG. 1, the subcompartments 10 can be accessed via doors 29 provided in the front wall 8. Trolleys 24, 25 can be driven into the compartments via the doors 29, which trolleys 24, 25 contain eggs 27 to be hatched in the subcompartment 10 or chicks 26 to be reared in the subcompartment 10. It will be clear that a different kind of door is also possible. Thus, it is conceivable to provide one pivot door which pivots about a horizontal hinge or a rolling door instead of four doors.

As can be seen in FIGS. 1 and 2, the space between the ceiling 28 of the compartment 2 and the ceiling 5 of the climate chamber 1 is subdivided by a partition 14. One or more fans 15 (not shown in FIG. 1) are provided in said partition 14. Said fan 15 can be driven by a motor 16 in order to cause an air stream to circulate in accordance with the arrows in FIG. 2. On the left-hand side, the fan 15 sucks in air from a return duct 23 and, via the ceiling 18 of the compartment 28, delivers it on the right-hand side to a chamber 22 which feeds the right-hand compartment 10. The air then enters the compartment 2 via the perforations in the heat exchanger 11, arrives in the first subcompartment 10 and horizontally flows through said first subcompartment, arrives in the second subcompartment 10 via heat exchanger 12 and horizontally flows through said second subcompartment 10, arrives in the third subcompartment via the opposite heat exchanger 12, horizontally flows through said third subcompartment and subsequently arrives in the fourth subcompartment 10 again via the opposite heat exchanger 12.

Having flowed through the fourth subcompartment 10 horizontally, the air will arrive in the return duct 23 via the side wall 17 which may, if desired, also be designed as a heat exchanger, or flow back to the intake side of the fan via the return duct. The return duct 23, the chamber 22 and the space between the ceiling 28 of the compartment and the ceiling 5 of the climate chamber together form an (upside down) U-shaped duct. Together with the compartment 2, said U-shaped duct forms a circuit.

So as to be able to supply fresh air to this circuit of circulating gas, an air inlet 20 is provided comprising a valve (not shown) for allowing more or less air to pass through, depending on the position of said valve. In order to be able to moisturize the air to be circulated in the circuit, a spray nozzle 18 is provided. In order to be able to discharge air from the circuit (for example when fresh air is supplied at 20), an air discharge 31 is provided.

According to the invention, said air discharge 31 is connected to the outlet of a cyclone separator 30. The cyclone separator 30 is installed in the chamber 22 which is situated next to the (right-hand) side wall 11 of the compartment. Said cyclone separator is indicated highly diagrammatically in FIGS. 1 and 2 by reference numeral 30 and is shown in more detail in FIGS. 3 and 4.

Figure 3:
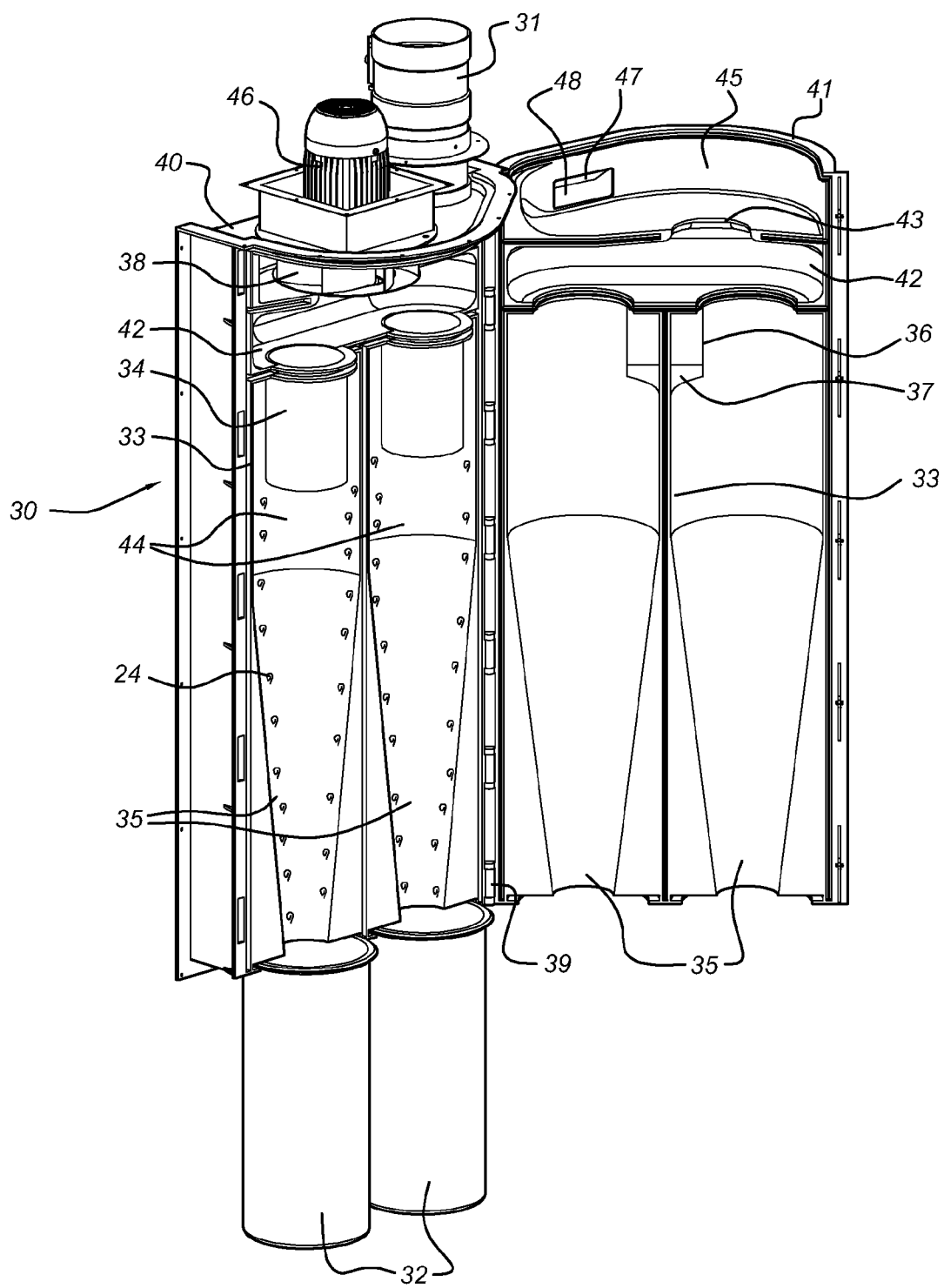
FIG. 3 shows a perspective view of an opened cyclone separator according to the invention and as used in FIGS. 1 and 2.

FIG. 3 shows a perspective view of the interior of the rear half 40 and the front half 41 of the cyclone separator 30. The rear half 40 is attached to the inside of the side wall 4 by the rear side which is turned away from the plane of the drawing. The cyclone separator 30 as illustrated in FIG. 3 is designed as a double cyclone separator, thus comprising essentially two cyclone chambers 44 which have been integrated into a single unit. The cyclone separator 30 comprises two outer tubes 33, each of which is provided with an inner tube 34 which projects inwards from the top end. Each of the outer tubes 33 is provided with a conically tapering part 35 at the bottom which ends in a collecting box 32 in which the particles 24 separated out of the air in the cyclone separator are collected. The top ends of the inner tube 34 end in a common discharge chamber 42. Said discharge chamber 42 has an outlet 43 which forms the inlet for a fan 38 which sucks in air in the axial direction and discharges air in the radial direction. The fan 38 is accommodated in a fan chamber 45 and is driven by a motor 46. The discharge 31 is connected to the fan chamber for discharging the gas which has been sucked in by the fan 38, such as air. Each cyclone chamber 44 is provided with a supply duct 37 for supplying gas, in particular air, to the inlet openings 36 of the cyclone chambers 44. Each inlet opening 36 is situated, viewed in the horizontal direction, next to the respective inner tubes 34. The supply ducts 37 are provided tangentially with respect to the cyclone chambers in such a manner that turbulence is immediately imparted to inflowing gas so that the latter swirls around the inner tube 34. When the fan 38 is switched on, it will want to blow air out via the discharge 31 (or the relief valve 46 still to be discussed in more detail), which results in air being sucked in from the discharge chamber 42. This sucking action results in air being sucked in via the supply ducts 37 and entering the outer tubes 33 via the inlet openings 36. In each outer tube 33, the inflowing air will be brought into a quick rotating flow around the associated inner tube 34. As a result of this quick rotating flow, particles 24 present in the air will be hurled outward and subsequently fall down in order to be collected in particle receptacle 32 via the conical part 35. The air which has been cleaned of particles 24 is extracted through the outer tubes 33 via the inner tubes 34.

When used in a climate chamber 1, a discharge valve (not shown) will be provided in the discharge 31 in order to close off the discharge when it is not necessary to discharge any gas, such as air. Without additional measures, this would mean that the cyclone separator would in fact not be operational when the discharge valve is closed, as the fan cannot discharge the gas. In that case, it would also be possible to switch off the fan. However, in order to increase the effectiveness of the cyclone separator 30 in such a climate chamber, the fan chamber 45 is furthermore provided with a relief outlet 48 via which the gas can nevertheless still be discharged from the fan chamber 45. Said relief outlet 48 ends in the chamber where the cyclone separator is suspended. If the cyclone separator is fitted in the climate chamber 1, this chamber will be the chamber 22 (FIG. 2). A relief valve 47 may be provided in the relief outlet 48 which opens automatically if a predetermined pressure is exceeded in the fan chamber. Thus, it is possible to ensure by means of the relief valve 47 that the relief outlet 48 only opens when the discharge valve is closed.

Figure 4:
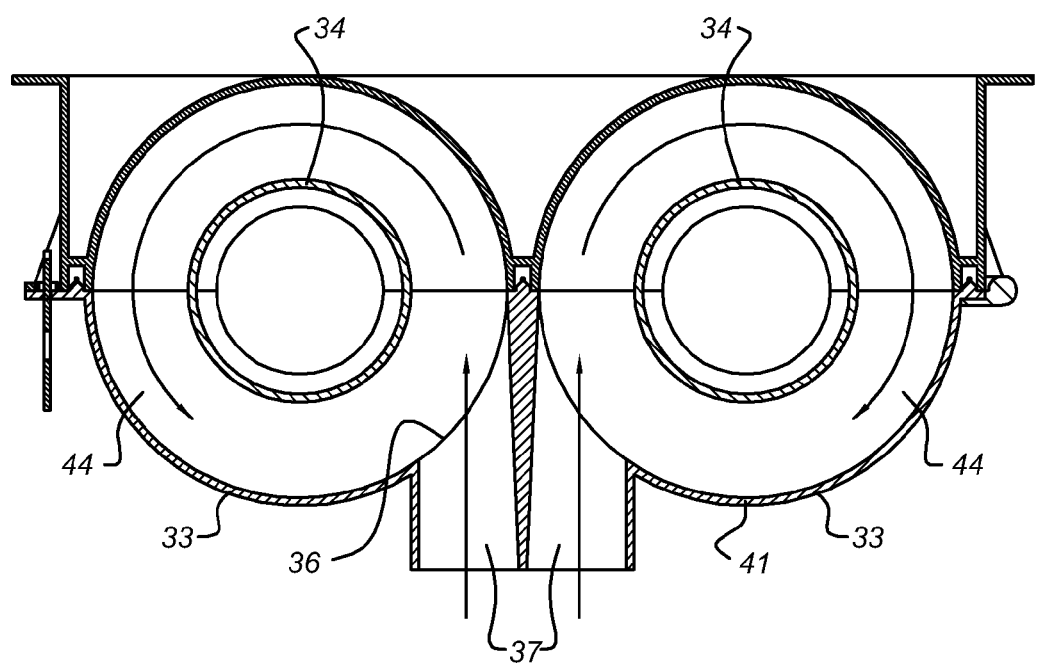
FIG. 4 shows a cross-sectional view of the closed cyclone separator from FIG. 3, which cross-sectional view is taken at the location of the inlets.

As FIG. 3 shows, the rear half 40 and the front half 41 are connected to one another by means of hinges 39. The hinges 39 make it possible to open the cyclone separator 30, for example for cleaning purposes. FIG. 3 shows the cyclone separator 30 in the open position. FIG. 4 shows the cyclone separator in horizontal cross section, taken at the location of the supply ducts 37, and in the closed position.

Figure 5:
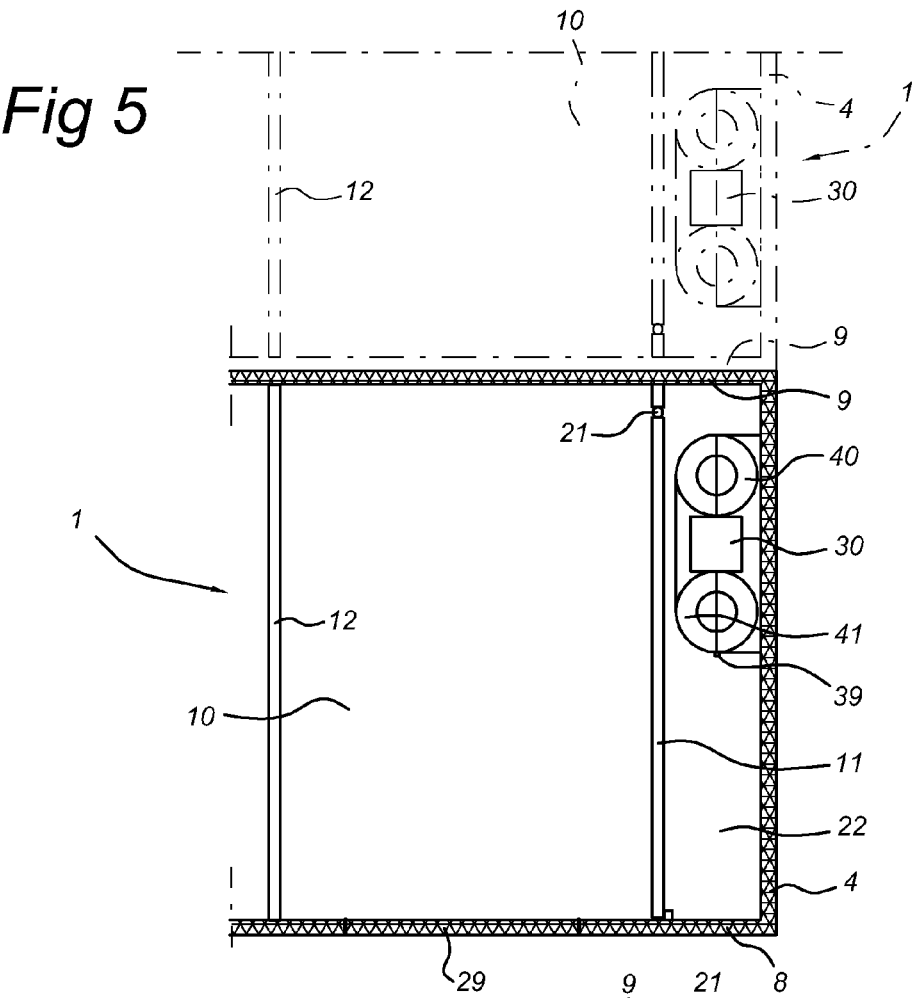
FIG. 5 shows a diagrammatic, horizontal longitudinal section of a part of the climate chamber from FIGS. 1 and 2.

FIG. 5 shows a horizontal cross section of the right-hand section of the climate chamber 1 from FIGS. 1 and 2, with only the right-most subcompartment 10. At the top in FIG. 5, a further climate chamber 1 is illustrated by dotted lines, the back of the rear wall 9 of which adjoins the back of the rear wall 9 of the other climate chamber.

Figure 6:
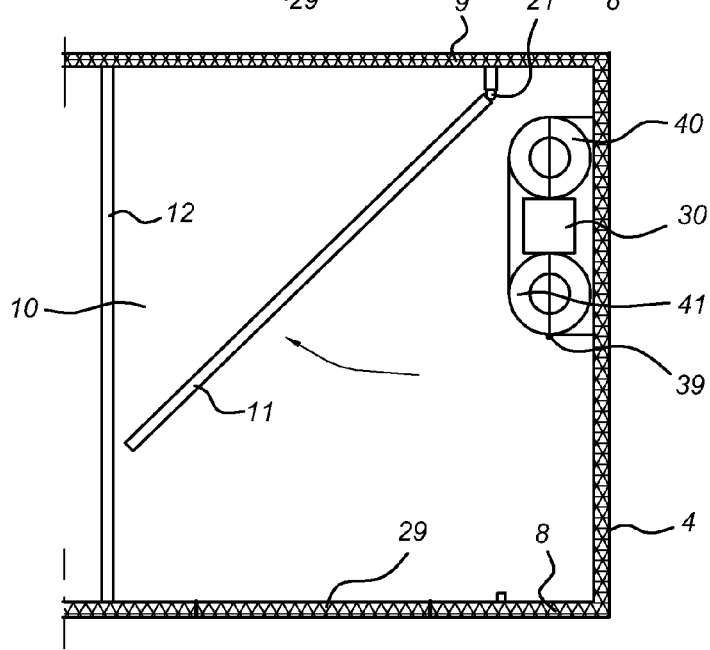
FIG. 6 shows a view similar to FIG. 5, but with one side wall of the compartment pivoted open.
Figure 7:
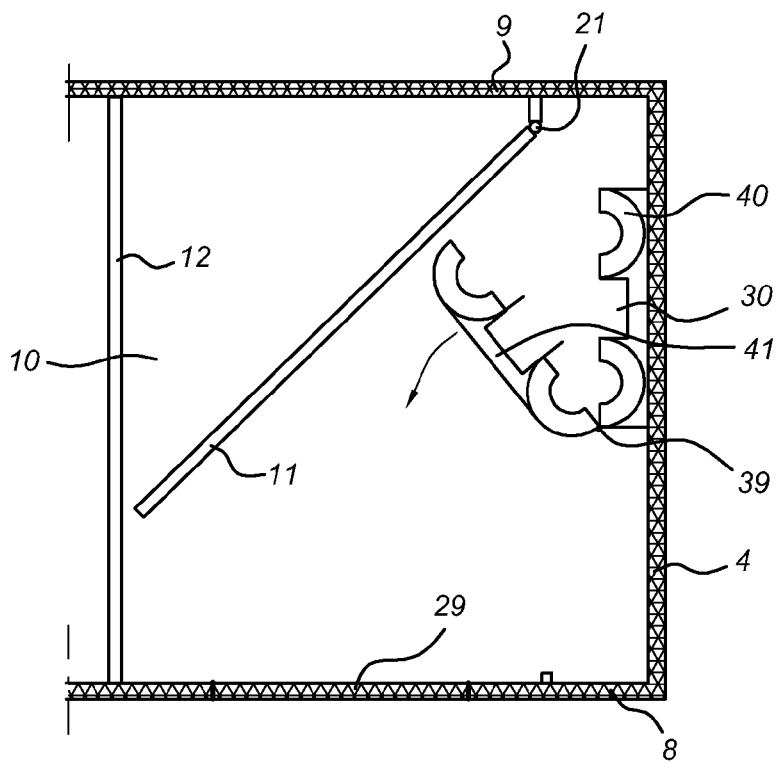
FIG. 7 shows a view similar to FIG. 6, but with the cyclone separator partially pivoted open.
Figure 8:
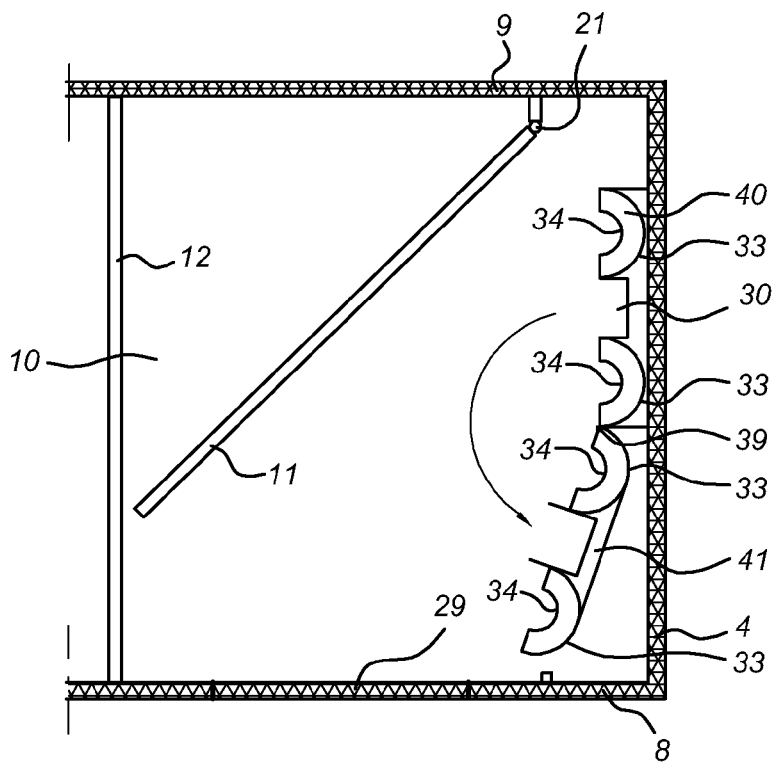
FIG. 8 shows a view similar to FIG. 7, but with the cyclone separator completely pivoted open.

FIGS. 6, 7 and 8 show views similar to that of FIG. 5, but the further climate chamber which is placed back-to-back against the climate chamber is in this case omitted.

FIG. 6 shows that the (right-hand) side wall 11 of the compartment 2, in this case a heat exchanger 11, can rotate into the subcompartment 10 by means of a vertical hinge 21 which is provided on the rear wall 9 of the compartment/the climate chamber. Thus, it is possible to gain access to the subcompartment 10 via the door 29 and pivot the side wall 11/heat exchanger 11 into the subcompartment 10, as illustrated in FIG. 6. Thus access is gained to the cyclone separator 30 which is situated in the chamber 22 and it is possible to remove and empty the particle receptacle 32 (FIG. 2). In addition, the front part 41 of the cyclone separator 30 can be pivoted open by the hinges 39, as is illustrated in FIG. 7. This pivoting movement can be continued until the completely pivoted open position as illustrated in FIG. 8 is reached. Thus, access is also gained to the interior of the cyclone separator 30. In order to be able to assess if the interior of the cyclone separator 30 is clean, it is advantageous according to the invention if the front part 41 of the cyclone separator is of transparent design, at least if the section of the outer tubes situated on the front part 41 is transparent. When the cyclone separator has been cleaned, it can be pivoted closed again, following which the side wall 11 can be brought into the position shown in FIG. 5 again.

Figure 9:
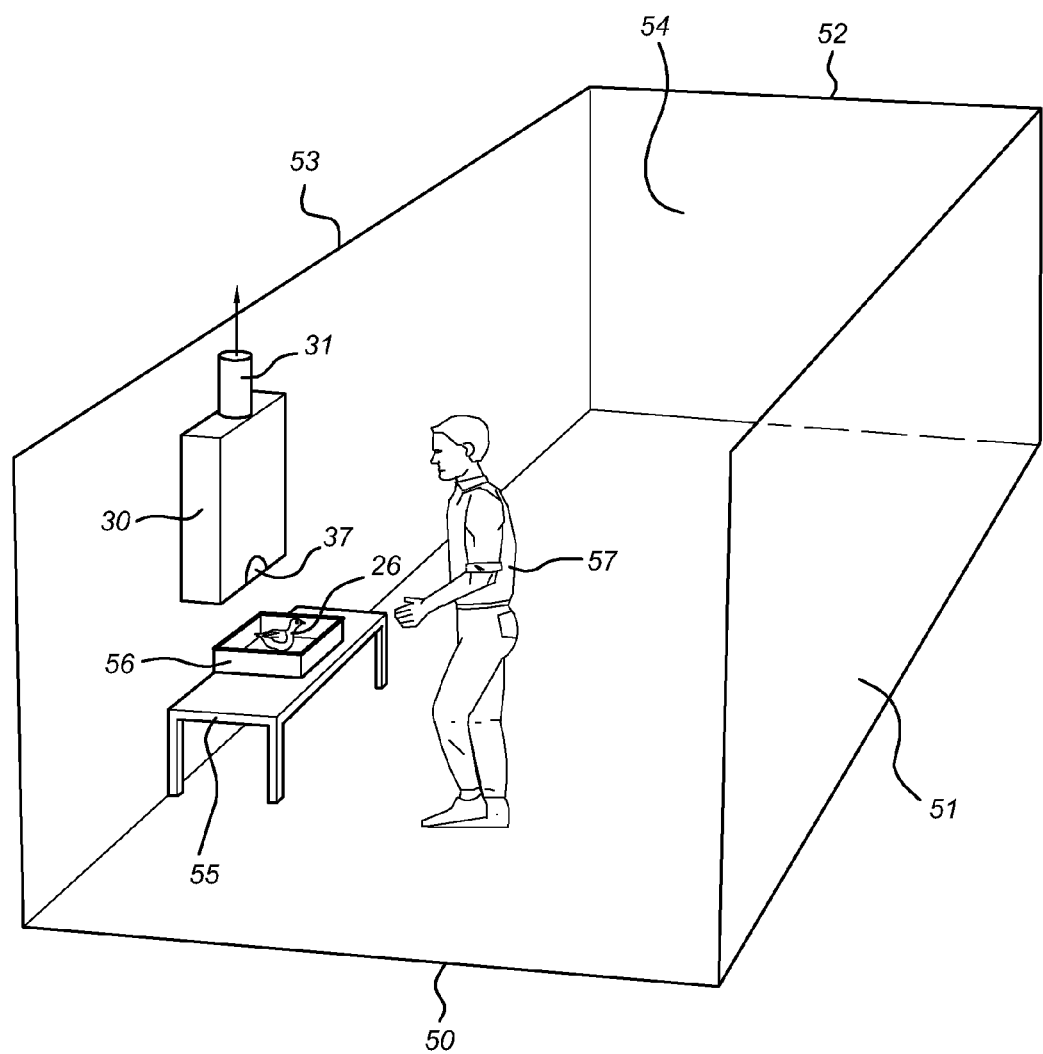
FIG. 9 shows a highly diagrammatic perspective view of a chamber containing a cyclone separator according to the invention, as well as poultry.

FIG. 9, finally, shows, by way of illustration, in a highly diagrammatic manner yet another method of use according to the invention. FIG. 9 shows a chamber, in particular a room, delimited by side walls. For the sake of clarity, the ceiling and the front side wall have been omitted in FIG. 9. The floor is denoted by reference numeral 50, two opposite side walls are denoted by reference numerals 51 and 53 and the rear wall is denoted by reference numeral 52. A cyclone separator 30, as described above, is situated in this chamber 54 or in this room, respectively. Said cyclone separator 30 is fitted on the side wall 53 and the inlet of the cyclone separator 30 ends at 37 in the chamber 54. The outlet 31 likewise ends in the chamber 54. Air which has been treated by the cyclone separator 30 does thus not leave the chamber 54, but is recirculated in the chamber, as it were. A work station 55 with a crate 56 containing chicks 26 thereon is situated in the chamber 54. A person diagrammatically indicated by reference numeral 57 is also present in the chamber 54 in order to submit the chicks 26 to an operation.

Both in the climate chamber as illustrated in the FIGS. 1, 2 and 5-8, and in the chamber as illustrated in FIG. 9, young birds, in particular young chicks, are present. Such chicks carry microorganisms, such as bacteria, viruses and yeasts, which are spread by means of keratin particles which are given off by said young birds, in particular down particles. By means of a cyclone separator 30, these down particles can be separated out of the air passed through said cyclone separator 30. Together with these down particles, the bacteria and germs are separated out of the air.

In the context of the present application, the term climate chamber is in particular intended to refer to a climate chamber for incubating eggs and/or a climate chamber for rearing chicks younger than four days or even of between zero and one day old. With all these applications, it is important to be able to control the temperature very accurately as young chicks are not able to regulate their own body temperature very well yet. In order to raise them under optimum conditions, it is important, particularly during the initial phase after hatching (birth), to keep these animals at a predetermined temperature which depends on the animal and to control this temperature very accurately. The term climate chamber according to the invention is understood to mean in particular a device having an internal chamber (the compartment) which is able to control the temperature inside and within the entire internal chamber with an accuracy of $\pm 3°$ C., preferably with an accuracy of $\pm 1°$ C. or even more accurately (the term accuracy is in this application understood to mean that the greatest temperature difference between any two locations in said chamber—the compartment—is at most said accuracy, i.e. at an accuracy of $\pm 1°$ C., the temperature difference will therefore be at most $2°$ C.). In this case, a climate chamber with insulated walls is used, inside which a specific desired climatized environment is maintained.

The invention claimed is:

1. A method for separating particles comprising down particles from air, the method comprising:
   (a) supplying air from the environment to a substantially closed duct;
   (b) introducing the air from the substantially closed duct to a substantially closed compartment comprising chicks younger than 7 days, wherein the substantially closed duct and the substantially closed compartment form a substantially closed circuit;
   (c) introducing the air from the substantially closed circuit to an inlet of a cyclone separator, wherein the cyclone separator comprises a first outlet which ends outside the substantially closed duct for directly discharging air into the environment, and a second outlet which ends inside the substantially closed duct;
   (d) returning a portion of the air to the substantially closed duct through the second outlet of the cyclone separator and circulating the air through the substantially closed compartment; and
   (e) discharging a portion of the air directly from the cyclone separator to the environment through the first outlet.

2. The method as claimed in claim 1, wherein the chicks are younger than 3 days.

3. The method as claimed in claim 1, wherein the chicks are 1 day old or younger.

4. The method as claimed in claim 3, wherein the down particles have a size of ≤0.1 mm.

5. The method as claimed in claim 1, wherein the particles comprise down particles having a size in the range of 0.01 to 0.10 mm.

6. The method as claimed in claim 1, wherein the chicks and the inlet and the second outlet of the cyclone separator are situated in a chamber.

7. The method as claimed in claim 6, in which the entire cyclone separator is situated in said chamber.

8. The method as claimed in claim 1, wherein gas is discharged from a climate chamber.

9. The method as claimed in claim 1, wherein the substantially closed compartment comprises a hatching machine.

10. The method as claimed in claim 1, wherein the substantially closed compartment comprises two opposite side walls provided with one or more passages; the substantially closed duct which extends outside the substantially closed compartment and connects one of said side walls to the other of said side walls so as to form the substantially closed circuit together with the substantially closed compartment; wherein gas is circulated through the substantially closed circuit; a supply ends in the substantially closed duct so as to supply air from the environment; the inlet of the cyclone separator ends in the substantially closed duct; and the first outlet of the cyclone separator ends outside the substantially closed duct for discharging into the environment.

11. The method as claimed in claim 10, wherein at least one of the opposite side walls is a perforated plate provided with a fluid line, through which a fluid is passed, wherein said side wall forms a heat exchanger by whereby the temperature of the gas passing through said side wall can be influenced.

12. The method as claimed in claim 10, wherein the compartment is subdivided into two or more subcompartments by at least one partition, with the partition running parallel to the two opposite side walls, wherein the partition is a perforated plate provided with a fluid line, through which a fluid is passed, in such a manner that said side wall forms a heat exchanger whereby the temperature of the gas passing through said side wall can be influenced.

* * * * *